United States Patent [19]
Tamura

[11] Patent Number: 6,161,867
[45] Date of Patent: *Dec. 19, 2000

[54] UNDERGUARD SKID BAR

[75] Inventor: Naoyuki Tamura, Columbus, Ohio

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/943,622

[22] Filed: Oct. 3, 1997

[51] Int. Cl.⁷ ...................................................... B60R 9/02
[52] U.S. Cl. .......................... 280/770; 180/69.1; 293/102
[58] Field of Search ..................................... 280/770, 495, 280/402, 784, 161, 762; 180/69.1; 293/102, 34, 35, 36, 125

[56] References Cited

U.S. PATENT DOCUMENTS

| | | | |
|---|---|---|---|
| 4,641,870 | 2/1987 | Heyman | 293/102 |
| 4,747,529 | 5/1988 | Hinderaker et al. | 224/325 |
| 5,799,976 | 9/1998 | Tischer | 280/770 |

*Primary Examiner*—Brian L. Johnson
*Assistant Examiner*—Faye M. Fleming
*Attorney, Agent, or Firm*—Armstrong, Westerman, Hattori, McLeland & Naughton

[57] ABSTRACT

A skid bar is mountable on existing front tow hooks of a vehicle, for protecting an engine, transmission and/or engine accessories from severe road conditions. The skid bar includes an elongated lateral member and a pair of end plates fixed to opposing ends of the lateral member. The end plates correspond to and are engageable with the existing tow hooks of the vehicle. The underguard skid bar extends in front of and below an engine/transmission assembly for protecting the same when the vehicle is travelling on a road having severe obstacles such as road bumps or road gutters. Each end plate has a plurality of bolt holes corresponding to tow openings in the existing tow hooks, such that each end plate is securable to the existing tow hooks, by being bolted thereto, through the tow openings in the existing tow hooks. Furthermore, each of the end plates presents a tow opening in a forward portion thereof.

12 Claims, 6 Drawing Sheets

UNDERGUARD SKID BAR

BACKGROUND OF THE INVENTION

1. Field of the Invention

The instant invention is directed to a device for protecting the underside of the engine and transmission and engine accessories of a vehicle from road speed bumps or road gutters. More specifically, this invention is directed to a underguard skid bar which extends in front of and below an engine/transmission assembly for protecting the same when the vehicle such as an automobile is traveling on road having speed bumps and road gutters.

2. Description of Related Art

In some locations, where speed bumps and road gutters are more severe than normal, automobiles have suffered transmission and/or engine and/or engine accessory damage caused by severe ground contract. Because such ground contact necessitates expensive repair costs, some type of skid plate or skid bar is desirable. A slid plate, covering the complete underside of the engine and transmission has been proposed and widely used in off road vehicles. However, such a skid plate can effect cooling performance in the engine compartment. The skid plate itself may, at times, cause damage to the transmission and/or engine. Further, mud may accumulate on and around the skid plate and thus create additional problems.

Further problems occur if the skid plate or skid bar is itself attached to the subframe by permanent subframe bolts. It is necessary and expensive to make sure that these bolts are tight. Furthermore, if there was damage to the slid plate or skid bar using the subframe bolts, it could also affect the tightness of the subframe bolts and thus the subframe, itself.

SUMMARY OF THE INVENTION

Accordingly, in view of the problems described above, it is desirable to employ a skid bar which bolts on easily without using any permanent subframe bolts.

An object of this invention is to provide for the necessary protection for the engine and transmission and engine accessories (such as a starter motor, alternator, A/C compressor, etc.) on normal roads, even with severe speed bumps or road gutters, without the necessity of having an off-road vehicle level of performance.

Another object of the invention is to provide for the necessary protection for the engine, transmission and engine accessories without affecting the engine or packaging layout in body construction. It is also an object of the instant invention to provide a system which is easy to install and may be installed by a local dealer.

Another object of the invention is to provide for a skid plate or skid bar which does not affect the NVH (Noise, Vibration and Harshness) and crush performance level of the vehicle.

Thus, an underguard skid bar is provided which mounts directly to the original equipment or existing tow hooks on the front of the vehicle, in front of the engine. It extends below the level of the engine, transmission and engine accessories in order to provide protection from severe road bumps or road gutters.

The underguard skid bar, according to the instant invention, provides protection against damage to the transmission and/or engine and/or engine accessories due to severe road bumps or road gutters, by providing a light, inexpensive skid bar which is easily attached to the already existing tow hooks on the front of the vehicle, and yet does not affect the cooling of the engine or engine compartment, and further does not affect the NVH or crush performance of the vehicle.

Specifically, the instant invention is directed to a skid bar, mountable on existing front tow hooks of a vehicle, for protecting an engine and/or transmission and/or engine accessories from damage due to severe road conditions. The skid bar includes an elongated lateral member and a pair of end plates fixed to opposing ends of the lateral member, wherein the end plates correspond to and are engageable with the existing tow hooks of the vehicle. Additionally, a fixing means may be supplied for fixing the end plates to the tow hooks of the vehicle.

In a preferable arrangement, the end plates includes bolt holes which correspond to tow openings in the existing tow hooks. This enables the end plates to be secured to the existing tow hooks by being bolted thereto. Additionally, anchoring nuts are provided on laterally interior sides of each end plate in order to correspond with bolt holes therein. In order to assist bolting the end plates to the existing tow hooks, a retaining plate is provided with holes therein. A pair of bolts are threaded through the holes in the retaining plate, through the tow opening in the existing tow hook and through the bolt holes in each end plate, and then to be secured by the anchoring nuts on each end plate. Since the tow openings in the existing tow hooks are used as a passage way for the bolts to secure the end plates to the existing tow hooks, it is necessary to provide additional tow hooks for the vehicle. Accordingly, each end plate has a forwardly extending portion which presents a tow opening therein. Thus, the skid bar, according to the instant invention, may be added to the existing tow hooks of a vehicle, without eliminating the capability of the vehicle to be towed by using tow hooks.

It should have also be noted that brackets may be fixed to one or both sides of each end plate. Such brackets are adapted to be engageable with the existing tow hooks in order to prevent rotation of the skid bar when it contacts the road surface.

Preferably, the lateral member of the skid bar, in accordance with the instant invention, is round in cross-section. Furthermore, it is preferable that the lateral member be cylindrical with an opening in the center thereof. This enables the skid bar to retain its strength, but yet maintain a light weight and inexpensive manufacturing cost.

Furthermore, each end plate may be provided with an opening in order to allow the interior of the cylindrical lateral member to communicate with the atmosphere, and thus to prevent the build up of corrosion inducing moisture inside of the cylindrical lateral member. It is preferable that the opening be a notch in the lower periphery of each end plate. Furthermore, it is desirable to coat the skid bar, according to the instant invention, in order to prevent corrosion. It may be coated with a normal paint or a corrosion resistant coating or any other type of desired coating. It is preferable that such a coating be applied by dipping the skid bar into the desired coating, in order to ensure full coverage of the interior. Of course, other methods of coating may be used, such as spraying, etc.

DETAILED DESCRIPTION OF THE INVENTION

Figure 1:
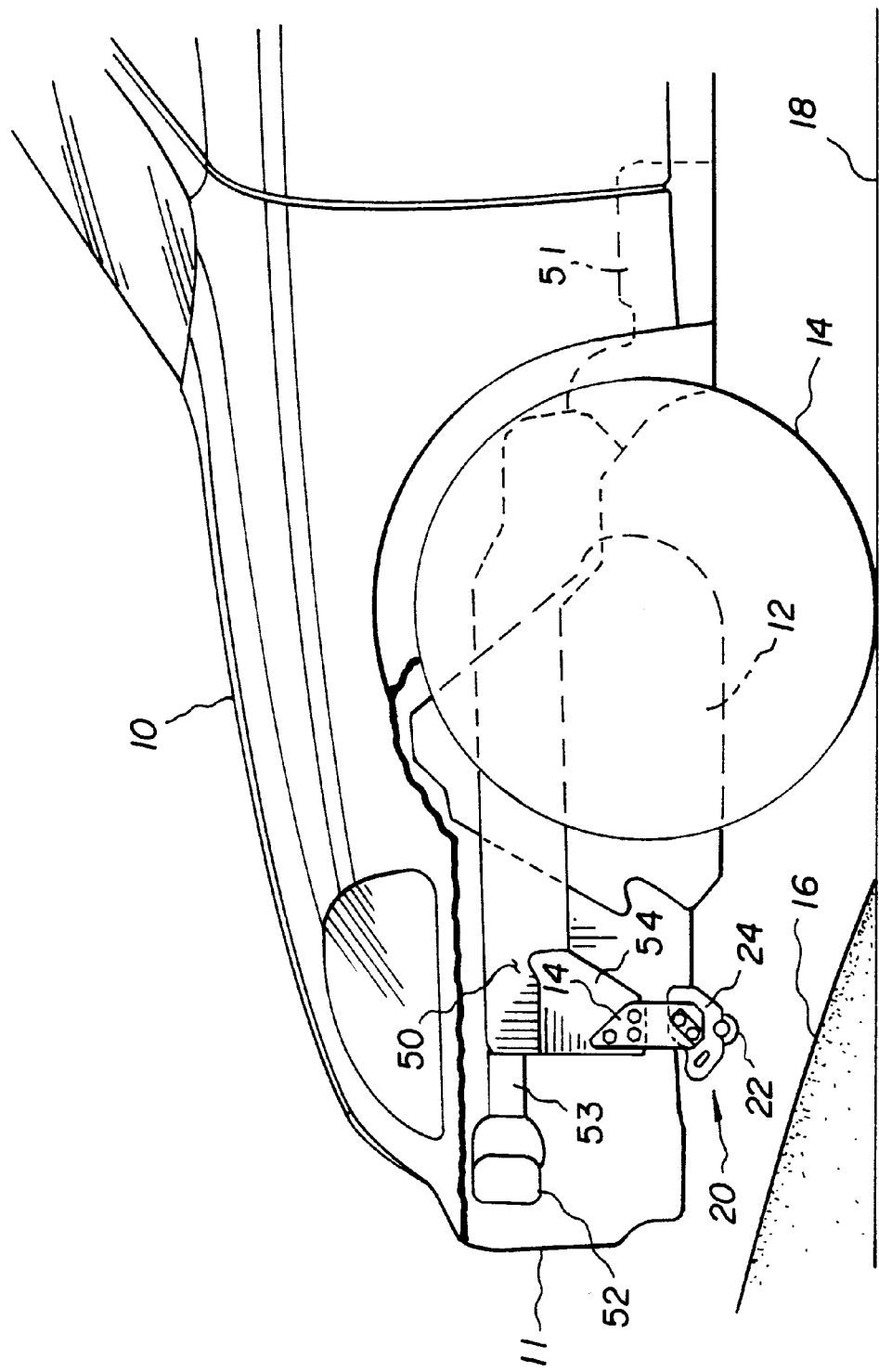
FIG. 1 is a partial cut away view of the front of a vehicle illustrating the underguard skid bar with relation to the vehicle and the transmission.
Figure 2:
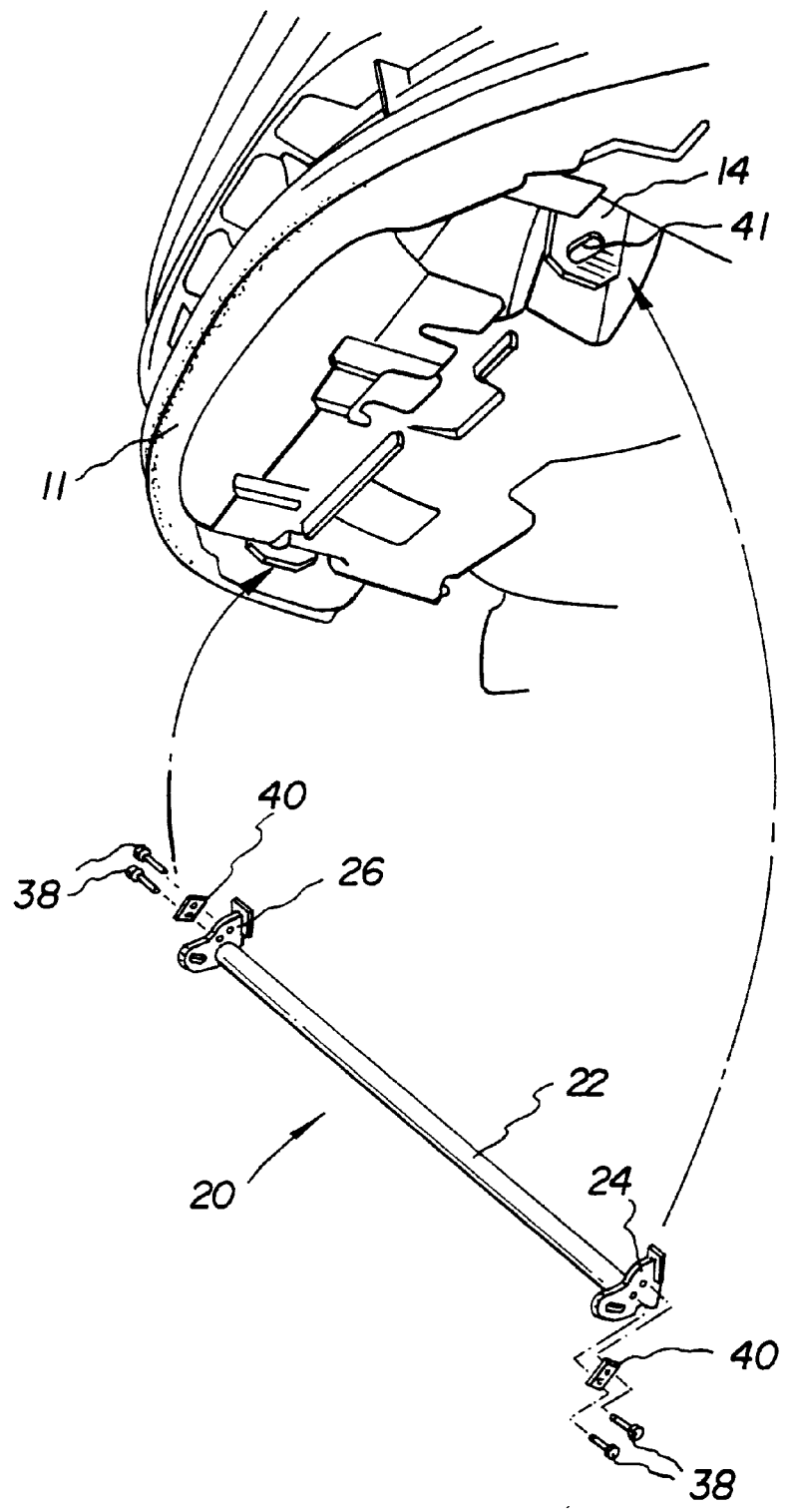
FIG. 2 is a perspective view from underneath the front end of the vehicle illustrating where the underguard skid bar is attached.

The instant underguard skid bar and its attachment to a vehicle are illustrated in FIGS. 1 and 2. FIGS. 3, 4, 6 and 7 illustrate the actual structure of the skid bar, while FIG. 5 illustrates the attachment of the skid bar to one of the existing tow hooks.

Figure 3:
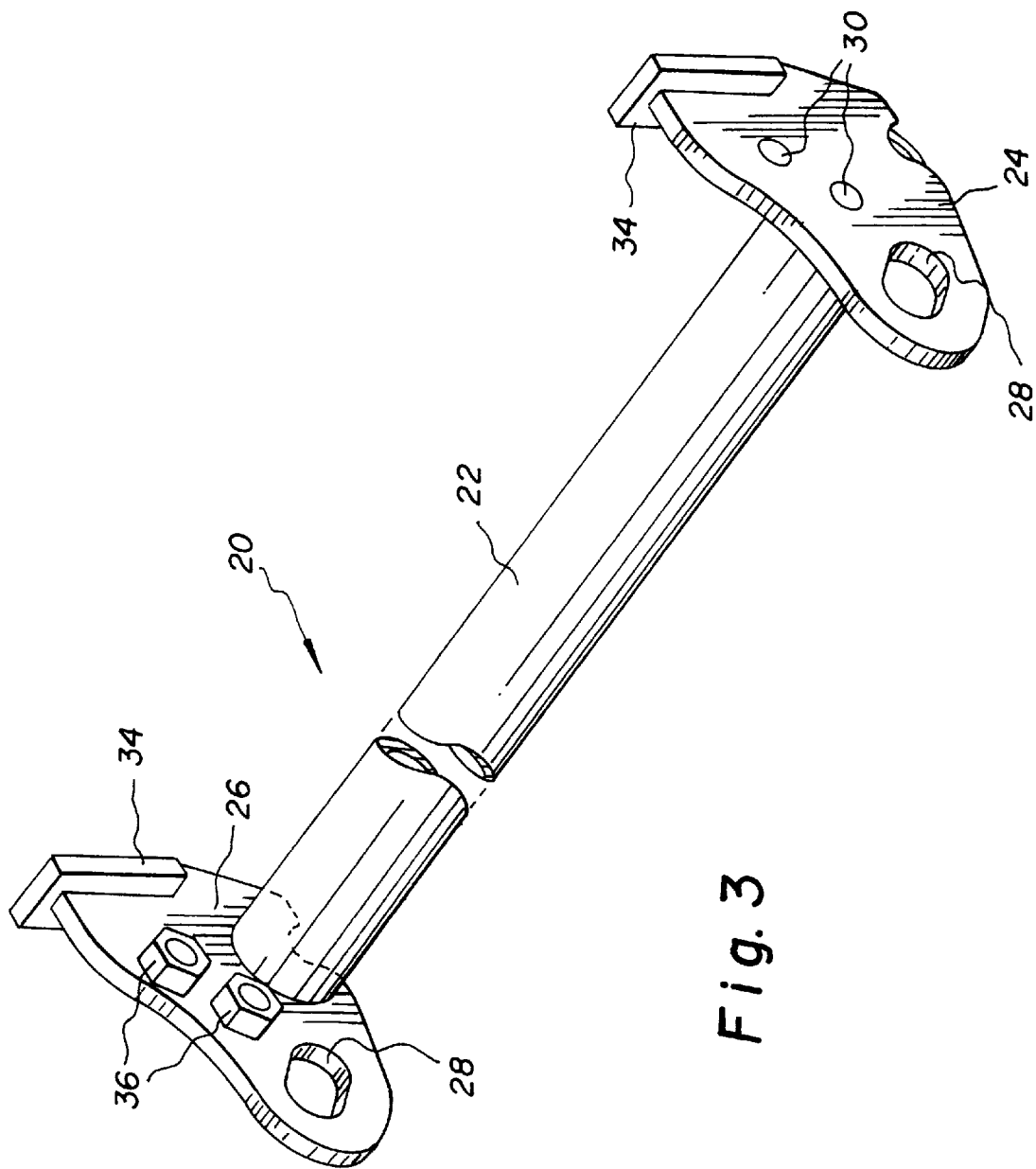
FIG. 3 is a perspective view of the skid bar with end plates.
Figure 4:
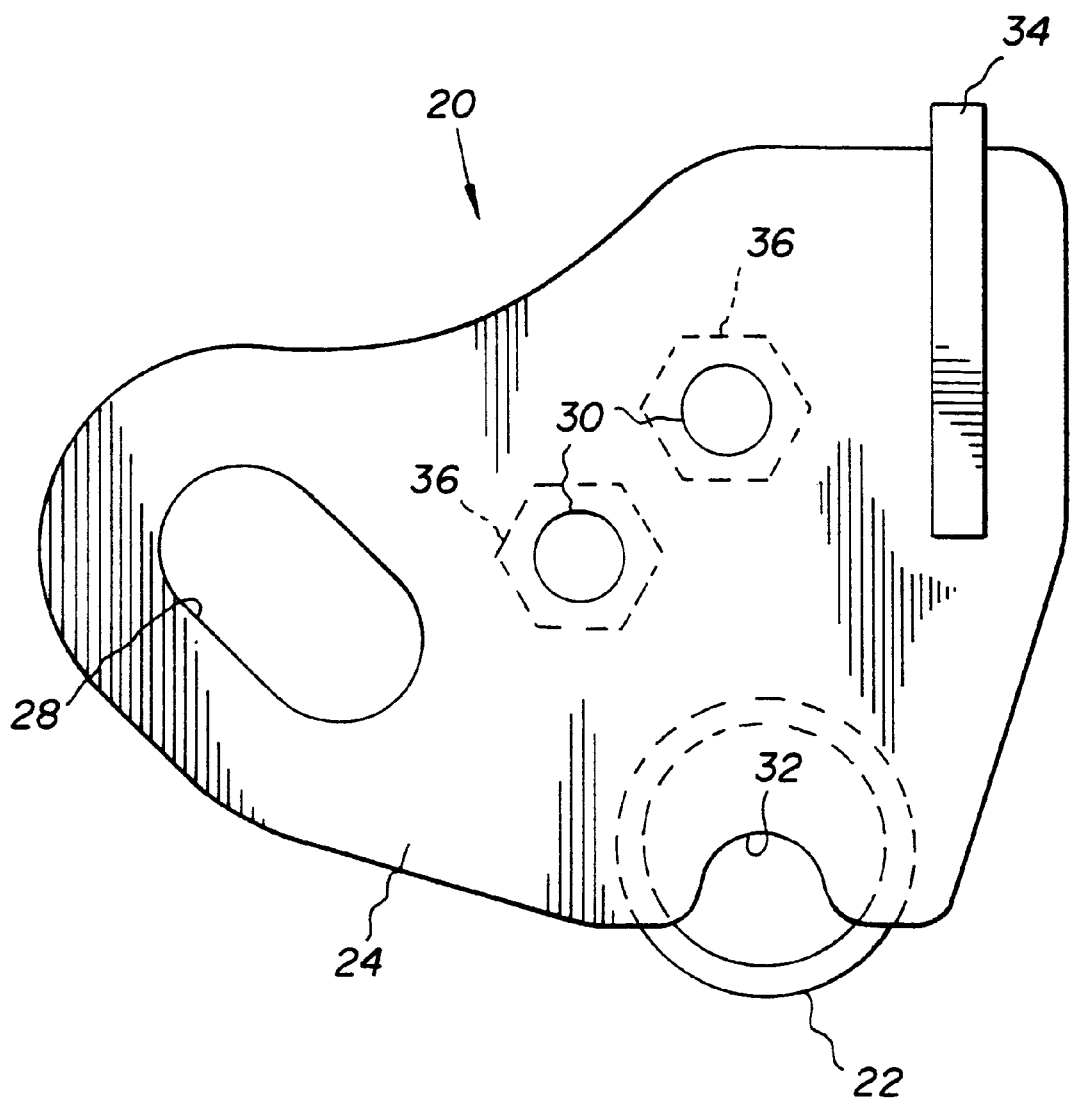
FIG. 4 is a side view of the left side end plate and the lateral member attached to it.
Figure 5:
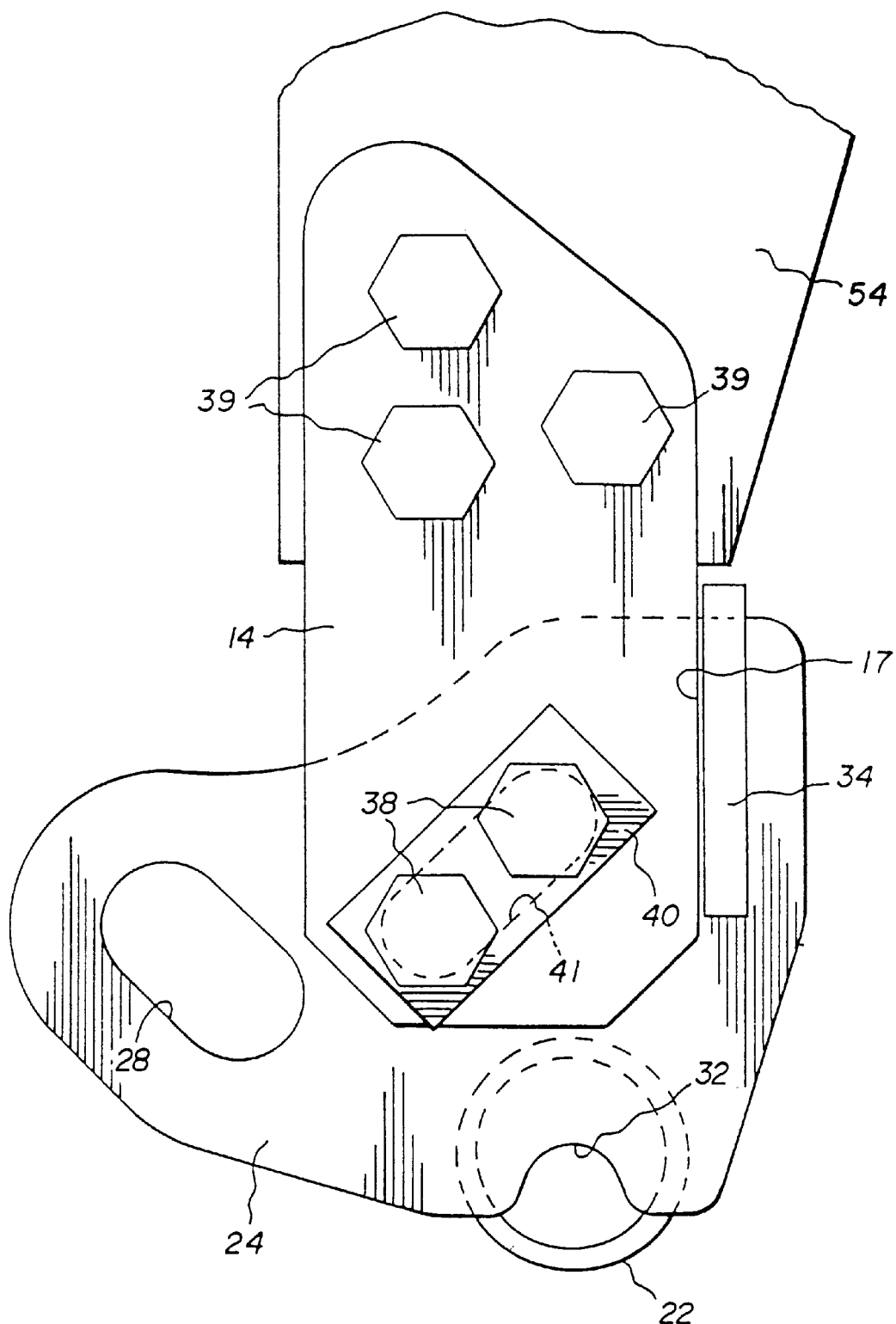
FIG. 5 is a side view of the end plate of the skid bar and the existing vehicle tow hook to which it is attached.

As illustrated in FIGS. 3 and 4, the underguard skid bar is indicated generally by the reference numeral 20. Skid bar 20 includes a lateral member or bar portion 22 which extends generally laterally across the vehicle. Attached to opposing ends of lateral bar portion 22 are end plates 24 and 26. FIG. 4 illustrates left side end plate 24 (positioned on the left side of the vehicle). As seen in FIGS. 3 and 4, lateral bar portion 22 is preferably a cylindrical, pipe-like structure, open in the center. Of course, it may be a solid bar and it may be either square or round, or any other desirable shape. End plates 24 and 26 are fixed to opposing ends of lateral bar portion 22. Bolt holes 30 are formed in a generally upper portion of end plate 24 and generally correspond with the tow opening 41 on the existing tow hooks 14 as illustrated in FIG. 2. Furthermore, a tow opening 28 is provided in a forward portion of end plate 24 instead of the tow opening in the existing tow hooks 14 which are used for mounting the underguard skid bar. End plates 24 and 26 are generally fixed to the lateral bar portion 22 in a perpendicular relationship. The end plates 24, 26 may be attached to the lateral bar portion 22 by welding, or any conventional means.

It is preferable that a lower opening or notch 32 be provided in each of end plates 24, 26, in order to allow an opening for the interior portion of the lateral bar portion 22. Thus the interior of the lateral bar portion 22 is able to communicate with the atmosphere in order to prevent the build up of corrosion enhancing moisture. Lateral bar portion 22 is ideally coated by a dipping method in order to completely cover the interior and exterior thereof to prevent corrosion and the like. Of course it may be coated with paint, other types of corrosion resistant coating, or any other desired coating. Notch 32 allows air to circulate throughout the interior of bar portion 22.

Bracket 34 is ideally placed near the upper rear portion of end plate 24 as illustrated in FIGS. 3 and 4. Bracket 34 may be positioned on one or both sides of the end plate, itself. Bracket 34 may be attached by welding or any other desirable method. End plate 26 is the mirror image of end plate 24. Anchoring nuts 36 are fixed to one side of end plate 24 and correspond with bolt holes 30. Anchoring nuts 36 may be welded to end plate 24 or may be affixed by any other desirable means.

Figure 6:
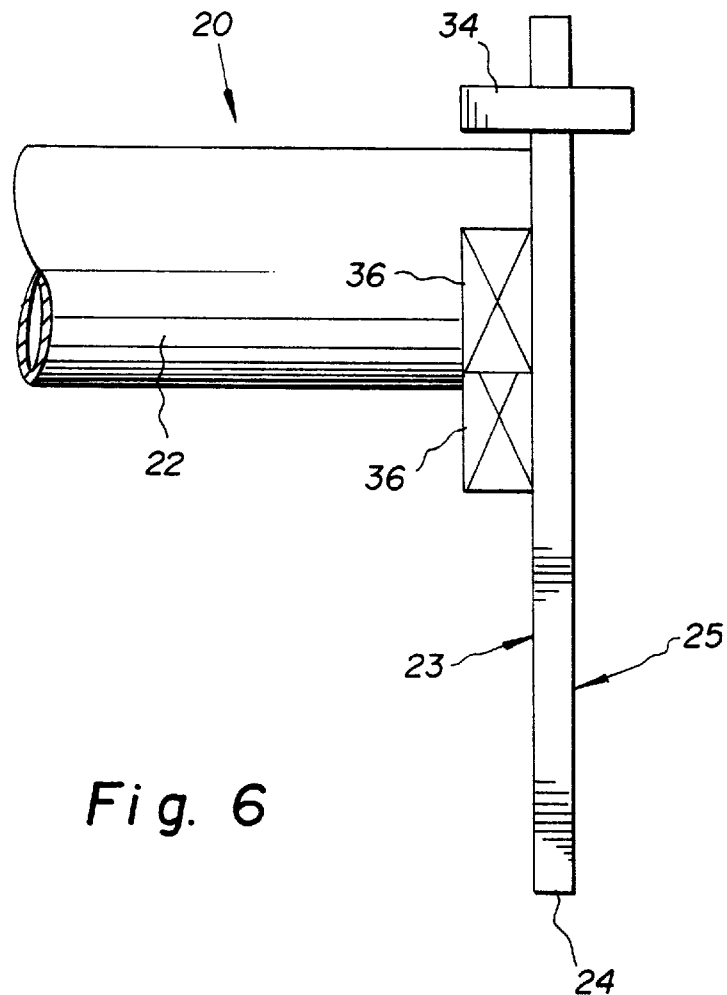
FIG. 6 is a plan view of the left side of the skid bar including the end plate and lateral member.
Figure 7:
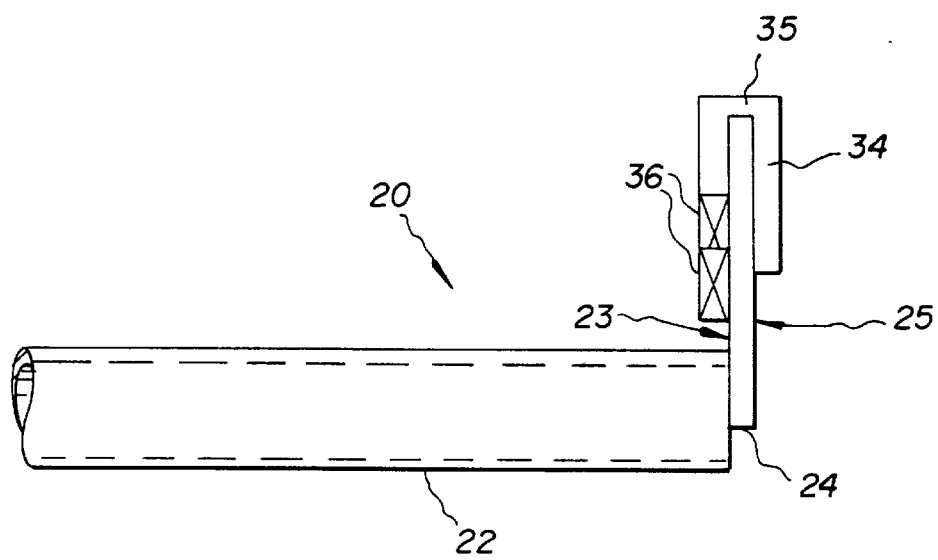
FIG. 7 is an elevational front view of the left side of the skid bar with the end plate and lateral member.

FIG. 6 illustrates a plan view of the left side of the skid bar 20 in accordance to the instant invention, detailing end plate 24. FIG. 7 is a front elevational view of the left side of the skid bar 20, also detailing left end plate 24. As seen in FIGS. 6 and 7, anchoring nuts 36 are fixed to a laterally interior side 23 of end plate 24. Also, it is seen that bracket 34 is disposed on the laterally exterior side 25 of end plate 24, as well as the laterally interior side 23 of end plate 24. A bight portion 35 connects the two side portions of bracket 34. It should be noted that end plate 26, as stated above, is the mirror image of end plate 24. Elements which are the same in end plates 24 and 26 are labelled with the same reference numeral.

The attachment of the underguard skid bar and the operation will now be described principally with respect to FIGS. 1, 2 and 5. As seen in FIGS. 1, 2 and 5, the underguard skid bar 20 is attached to existing tow hooks 14. As seen in the partial cut away view of FIG. 1, a side frame member 50 extends from a rear portion 51, thereof, to the front of the vehicle. A bumper support 52 is attached to the front of side frame 50 by way of box member 53. Preferably, side frame 50 also has a box-type construction. A downwardly extending box structure 54 is provided on the front end of side frame 50 to provide support for tow hooks 14, which are directly attached to box structure 54. As seen in FIG. 1, underguard skid bar 20 is disposed ahead of and extends below the level of transmission 12.

As illustrated in FIG. 1, existing tow hook 14 (on the left side of the vehicle) is positioned on box structure 54, between transmission 12 and bumper facia 11. FIG. 1 illustrates wheel 14 of the vehicle 10 on road surface 18. A speed bump 16 is illustrated in front of wheel 14. When encountering a speed bump 16 (or a severe road gutter) lateral bar 22 will strike the speed bump or gutter edge before transmission 12 or part of the engine or engine accessories (not shown). Thus, the presence of the skid bar 20 will prevent or reduce damage to the transmission under severe road conditions.

FIG. 2 illustrates the positioning of underguard skid bar 20 with respect to existing tow hook 14. As also illustrated in FIG. 5, the end plates 24, 26 of the underguard skid bar 20 are nestled next to existing tow hooks 14. Preferably, end plates 24, 26 are positioned laterally inside of original tow hooks 14. Retaining plate 40, having two holes therein, each of which corresponds with bolt holes 30 in end plates 24, 26, are positioned on the laterally outer side of each existing tow hook 14. Bolts 38 are inserted through retaining plate 40, through tow openings 41 in existing tow hooks 14, through bolt holes 30 of end plates 24, 26 and are then secured by anchoring nuts 36 which are fixed on the laterally interior side of each end plate 24, 26. Bracket 34 of end plates 24, 26 are engageable with, to bear against, a rear portion 17 of each existing tow hook 14. This prevents rotational movement of the skid bar when it hits a ground object, such as a speed bump. Thus, bolts 38, when assembled, extend through existing tow hook 14 to provide proper attachment of the underguard skid bar to the vehicle. End plates 24, 26 of the underguard skid bar 20 provide for a tow opening 28 in order for there to be a tow hook for the vehicle when the instant skid bar is in place.

As illustrated in FIG. 1, existing tow hook 14 is attached to downwardly extending box member 54 by way of bolts 39. Existing tow hook 14 extends generally downward from frame member 50 end presents a tow opening 41 (shown in dotted in FIG. 5 lines). Tow opening 41 presents the original aperture for towing the vehicle. As further illustrated in FIG. 5, bracket 34 extends generally vertically along the laterally exterior side of end plate 24. It also extends on the laterally interior side of the end plate 24. As clearly seen in FIG. 5, bracket 34 is engageable with rear portion or edge 17 of existing tow hook 14 to prevent rotation of the skid bar 20 (including end plates 24, 26 and lateral bar 22) when a road portion is hit by lateral bar 22.

Thus, the underguard skid bar of the instant invention provides for an easy to install, inexpensive and light weight protection for the engine and/or transmission when encountering severe speed bump or severe gutters on normal roads. This is accomplished without substantially affecting the cooling, NVH or crush protection of the vehicle.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. In combination, an under vehicle skid bar, and an automobile, said automobile having front tow hooks fixed to an underside of the automobile, extending downwardly from a side frame of the automobile and located between a transmission and a bumper facia, and said skid bar comprising:
an elongated lateral member; and
a pair of end plates fixed to opposing ends of said lateral member, wherein said end plates correspond to and are engaged with said tow hooks fixed to the underside of the automobile, said skid bar protecting an engine, transmission and/or engine accessories from road surface irregularities.

2. The combination of claim 1, wherein each of said end plates of said skid bar has a plurality of bolt holes corresponding to tow openings in said tow hooks, such that each end plate is secured to the existing tow hooks, by bolts extending through said tow openings in the existing tow hooks.

3. The combination of claim 2, wherein each of said end plates of said skid bar presents a tow opening in a forward portion thereof.

4. The combination claim 3, wherein each of said end plates of said skid bar includes anchoring nuts fixed to a laterally interior side of each end plate and corresponding with said bolt holes.

5. The combination of claim 4, wherein each of said end plates of said skid bar includes a generally vertical bracket, on a laterally exterior side thereof, such that said bracket is engageable with the existing tow hook to prevent rotation of said skid bar when it comes into contact with a road surface.

6. The combination of claim 5, wherein said bracket on each end plate of said skid bar extends on both laterally interior and exterior sides of each of said end plates.

7. The combination of claim 1, wherein said lateral member of said skid bar is round in cross-section.

8. The combination of claim 7, wherein said lateral member of said skid bar is cylindrical, with an open space in the center thereof.

9. The combination of claim 8, wherein each of said end plates of said skid bar is fixed to an opposing end of said cylindrical lateral member, and generally perpendicular thereto, and further wherein each end plate has a lower opening positioned with respect to said cylindrical lateral member in order to allow the interior of said cylindrical lateral member to communicate with the atmosphere.

10. The combination of claim 9, wherein said lower opening in each end plate is a notch on a lower periphery of said end plate.

11. The combination of claim 4, each end plate of said skid bar further comprising a retaining plate with holes therein, said bolts threaded through said holes in said retaining plate, through the tow opening in said tow hook and through said bolt holes in each end plate, to be secured by said anchoring nuts on each end plate.

12. The combination of claim 8, wherein surfaces of said cylindrical lateral member of said skid bar and said end plates are coated, including the interior of said cylindrical elongated lateral member.

* * * * *